No. 723,895. PATENTED MAR. 31, 1903.
F. B. MILLS.
FEED OR WATER PAN FOR POULTRY.
APPLICATION FILED JUNE 30, 1902.
NO MODEL. 2 SHEETS—SHEET 1.
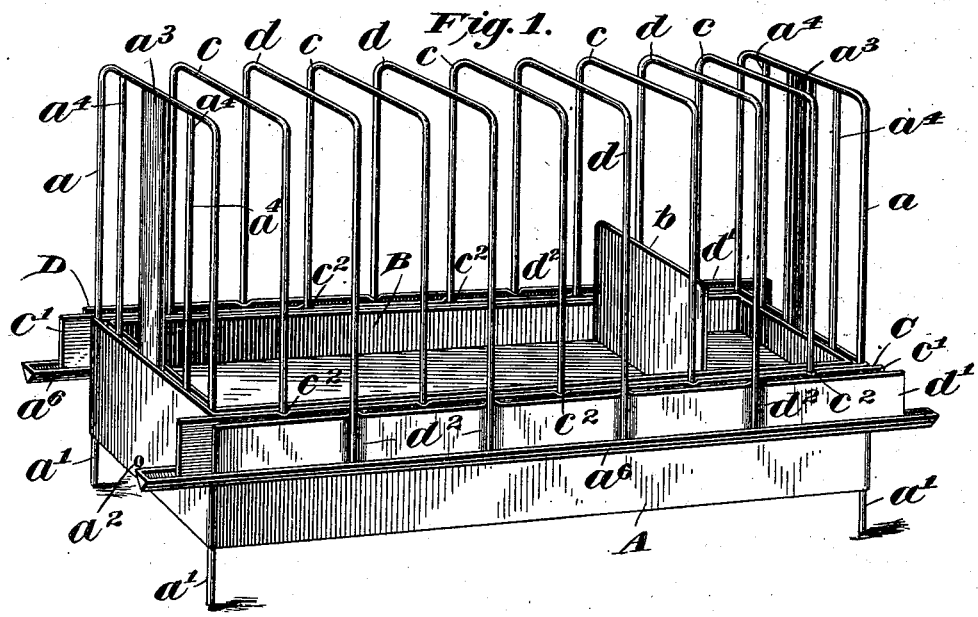
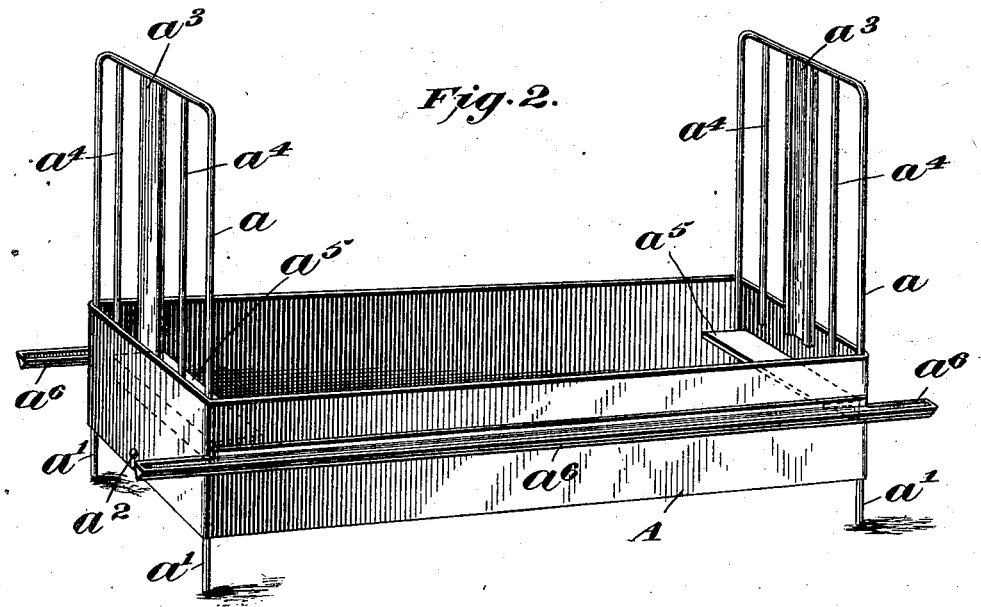
Witnesses
Elmer Seavey
Inventor
Frank B. Mills
By his Attorney No. 723,895. PATENTED MAR. 31, 1903.
F. B. MILLS.
FEED OR WATER PAN FOR POULTRY.
APPLICATION FILED JUNE 30, 1902.
NO MODEL. 2 SHEETS—SHEET 2.
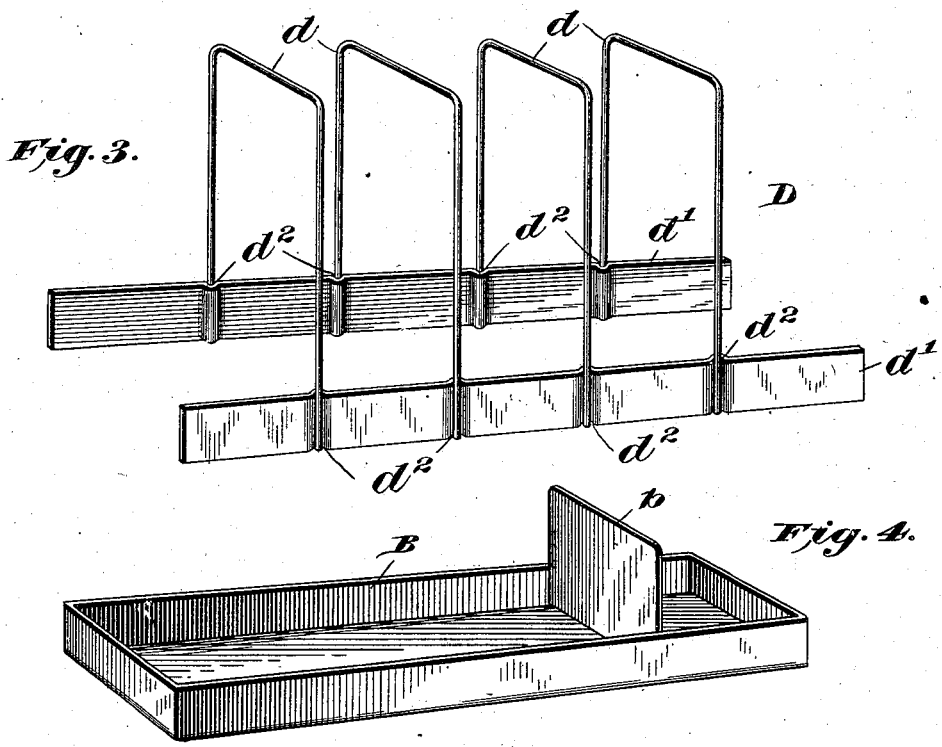
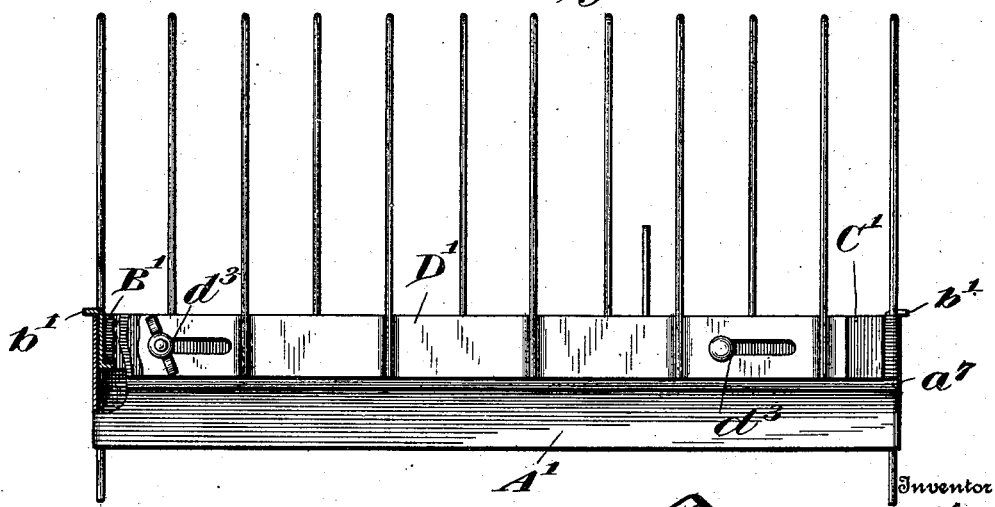
Witnesses
Elmer Seavey
Inventor
Frank B. Mills
By Julian C. Dowell
his Attorney

UNITED STATES PATENT OFFICE.

FRANK B. MILLS, OF WILMINGTON, OHIO.

FEED OR WATER PAN FOR POULTRY.

SPECIFICATION forming part of Letters Patent No. 723,895, dated March 31, 1903.

Application filed June 30, 1902. Serial No. 113,828. (No model.)

*To all whom it may concern:*

Be it known that I, FRANK B. MILLS, a citizen of the United States, residing at Wilmington, in the county of Clinton and State of Ohio, have invented a new and useful Feed or Water Pan for Poultry; and I do hereby declare the following to be a full, clear, and exact description of the invention, such as will enable others skilled in the art to which it appertains to make and use the same.

This invention relates to feeding and watering devices for poultry; and the principal objects are, first, to provide efficient means whereby the chickens or other fowls will be permitted to feed or drink at will, but at the same time will be kept from getting into the feed pan or trough, thus preventing them from scratching, scattering, and wasting the food and rendering the food and water dirty and impure; second, to provide for adjustment of the feed openings or spaces to suit chickens of different sizes, so that the device may be arranged to permit small chicks to have access to the food, while excluding larger fowls, thus preventing the latter from consuming the specially-prepared and costly foods intended only for young chickens; third, to allow for removal of the feed-pan for cleaning or cooking or preparing feed therein and for readily replacing the same; and, finally, to produce a simple, inexpensive, and exceedingly useful device of this character.

With these and other minor objects in view the invention will hereinafter be first fully described with reference to the accompanying drawings, which form a part of this specification, and then pointed out in the appended claims.

In said drawings, wherein the same letters of reference indicate corresponding parts in the different figures, Figure 1 is a perspective view of a device embodying my invention. Fig. 2 is a similar view of the base or stand which supports the feed and water pan or pans. Fig. 3 is a perspective view of one of the members of the adjustable cage or grating which prevents the fowls from getting into the food and water. Fig. 4 is a perspective view of the feed and water pan or tray taken from the device shown in Fig. 1, and Fig. 5 is a side elevation of a modified form of device embodying my invention.

Referring to Figs. 1 to 4 of the drawings, the letter A designates the base or supporting-stand of the device. B denotes the feed and water pan, and the letters C and D denote the two members of an adjustable cage or grating which prevents the chickens or other fowls from getting into the feed and water. The said base or supporting-stand A consists, in the main, of a casing, preferably of rectangular form, and may be constructed from a single strip of galvanized iron or other sheet metal by bending the same into the required form and soldering or otherwise securing its ends together. In the construction illustrated two U-shaped wires or rods $a\ a$ are vertically secured to opposite ends of said casing, their end portions or members being soldered in the corners thereof, so that the central U-shaped portions of said wires project considerably above the casing, while their lower ends $a'$ project slightly below and constitute legs or supports. These legs $a'$ may be stuck into the ground or into suitable holes provided therefor in a board or in the floor of a poultry-house for the purpose of preventing upsetting or overturning of the device, or said device may be fastened to a board or floor by guy-wires secured in apertures $a^2$ in the ends of the casing and attached to staples driven into said board or floor, or the feed and water pan may be secured in place by other suitable means. Vertical braces or sheet-metal strips $a^3$ may connect the middle portions of the wires $a$ and the ends of the base or casing A, and vertically-disposed wires $a^4$ may be soldered or secured to said U-shaped wires and ends of the casing at each side of said braces, thus caging or closing the ends of the device, so as to prevent the chickens or other poultry from getting through the same into the feed and water. It will be understood, of course, that in place of the U-shaped wires the upright or projecting end members of the device may be formed in any suitable way, as, for instance, by increasing the height of the ends of the base or casing.

The feed and water pan B, as shown, consists of an oblong shallow box or receptacle, which may obviously be constructed from a single blank of sheet metal. This pan fits within the base or casing A, resting upon suitable ledges or shelves $a^5$ in the ends thereof, though the pan may be supported by other suitable means. The said pan is provided with a transverse partition $b$ nearer one end than the other, which divides it into separate feed and water receptacles, the larger being intended for the feed and the smaller for water. Said partition $b$ is made sufficiently high to prevent a chicken from throwing food from the feed-receptacle over into the water, and thereby polluting the latter. In place of the feed-pan B two or more smaller pans may be substituted, which may rest on suitable projections on the inner sides of the base or casing A or may be otherwise supported.

The two members C and D of the adjustable cage or grating are of substantially similar construction, each preferably consisting of a number of arched or U-shaped wires or rods $c$ and $d$, having their ends secured to parallel strips or slides $c'$ and $d'$, respectively, made preferably of sheet metal. The member C fits over the base or casing A, and its strips or slides $c'$ are held tightly against the sides of the casing by inward pressure of the U-shaped wires or rods, which act as springs. The member D fits over the member C, and the strips or slides $d'$ of the former are held in place against those of the latter in the same manner. The outer member is slidable on the inner member, which is slidable on the casing, and hence said members may be adjusted as desired to regulate the widths of the spaces between the wires $c$ and $d$. The said wires $c$ and $d$ alternate with one another and are preferably arranged to stand at equal distances apart when the members C and D are in normal position, as represented in Fig. 1 of the drawings, and hence by adjusting said members so as to bring the wires $c$ and $d$ together the widths of the feed openings or spaces may be doubled. The said strips or slides $c'$ and $d'$ may be supported at the sides of the casing by any suitable means, though preferably in grooves or slots, as $a^6$, which may be formed by V-shaped strips or pieces attached longitudinally to the base or casing and extending beyond its ends a short distance to permit a wide range of adjustability of the members C and D. The lower edges or portions of said strips or slides $c'$ and $d'$ fit tightly within said grooves, which thus assist in holding the two members of the cage rigidly in place, so that the chickens are unable to move the same. Movement of said members, in the present device, is further resisted by the mode of attachment of the U-shaped wires to their strips or slides. As shown, the ends of these wires lie within grooves formed by transverse shoulders or ridges in the strips, as at $c^2$ and $d^2$, and the shoulders or projecting portions of each strip confront and ride against the other strip. This arrangement may of course be dispensed with or modified. Any suitable means, such as a set-screw entered through suitable slots in the strips, may be provided to lock the members C and D in position; but this is not essential, since the construction described is sufficient to prevent movement of either of said members by the chickens, though the said members may be readily adjusted or manipulated by a person.

In use the spaces or interstices between the wires $c$ and $d$ are adjusted or made wide enough to admit only the heads of the chickens or fowls to be fed. The chickens are thus permitted to feed and drink at will, but are prevented from getting their feet or bodies into the pan, thus keeping them from scratching and scattering the feed, preventing them from becoming wet and being made unhealthy, and keeping their food and water in clean, pure, and healthful condition. Young chickens may be fed from the device in the same yard with larger fowls by graduating the spaces between the wires so that the more mature fowls cannot get their heads through and reach the costly and specially prepared foods intended only for the young chicks or birds.

The members C and D may be readily lifted off or detached from the casing, thus permitting removal of the pan or pans for cleaning, or cooking, or preparing food therein. When the pan is replaced, the adjustable cage or grating may be easily put in place again by holding the strips or slides slightly apart against force of the springs or inwardly pressing wires $c$ and $d$.

While my improved feed and water pan or device is preferably constructed of wire and sheet metal, as described, for the purposes of lightness, strength, durability, simplicity of construction, and economy of manufacture, it will be understood that the device or the several parts thereof may be formed of any suitable material and constructed in any suitable way. In some instances the base or casing A may be dispensed with and the adjustable cage or grating may be applied directly to a suitable form of feed-pan, though said casing A is preferred, since it may be fixed in place on the floor or ground and supports the shallow feed-pan at a proper height to compel the chickens to stand up to the feed, permits removal of the pan, and affords a convenient support for mounting the adjustable cage or grating over said pan. In some instances, also, the inner cage member or the rods or wires thereof may be fixed to the pan or its supporting base, though the arrangement shown is preferred, since it permits entire removal of the cage or grating for cleaning the pan or preparing or cooking food therein. In place of the arched or U-shaped wires or rods $c$ and $d$ any suitable grating members may be used, though the wires are preferred for their small size, lightness, and inward spring-pressure.

In the modified construction illustrated in Fig. 5 the feed-pan, which is designated by the letter B', is provided at its ends with projections $b'$, which rest upon the ends of the casing A', and thus support said pan. The two members of the cage or grating, which are indicated by the letters C' and D', are supported upon longitudinal ribs $a^7$ at the sides of the casing, and one of the wire-supporting strips of the outer member is adjustably secured to the corresponding strip of the inner member by slot-and-pin connections, as shown at $d^3$, one of the pins being in the form of a set-screw for locking the members together.

It will be understood, of course, that the device is also susceptible of other modifications in the details of construction and arrangement without departing from the scope of my invention.

Having thus fully described my invention, what I claim as new, and desire to secure by Letters Patent of the United States, is—

1. In a poultry-feeding device, the combination of a feed-pan, a cage or grating therefor having vertically-disposed interstices to admit the heads of the fowls, and means for adjusting the widths of said interstices; substantially as described.

2. In combination with a feed-pan, a grating consisting of a series of rods or uprights rising from the side thereof, and longitudinally-shiftable means to which alternate rods of the series are secured, for the purpose of adjusting the widths of the interstices of the grating; substantially as described.

3. In combination with a feed-pan, a cage or grating suitably mounted thereon consisting of a series of arched or U-shaped members spanning said pan, and slides at opposite sides of said pan to which the ends of alternate members of the series are secured; substantially as described.

4. In combination with a feed-pan, a cage or grating suitably mounted thereon consisting of a series of arched or U-shaped members spanning said pan, a pair of slides at opposite sides of the pan to which alternate members of the series are secured, and a second pair of slides to which intermediate members are secured; substantially as described.

5. In combination with a feed pan or casing, an adjustable cage or grating removably mounted thereon consisting of a series of arched or U-shaped wires having their ends alternately connected to strips at opposite sides of said pan or casing, said strips being held in place or clamped against said pan or casing by inward pressure of the wires; substantially as described.

6. The combination of a base or casing, a feed-pan removably supported therein, and an adjustable cage or grating removably mounted on said casing and covering the feed-pan; substantially as described.

7. The combination of a casing, a feed pan or tray removably supported therein, and an adjustable cage or grating removably mounted on said casing consisting of a series of arched or U-shaped wires spanning the pan and having their lower ends alternately connected to strips at opposite sides of the casing, said strips being held in place or clamped against the casing by inward pressure of the wires, and means for closing or caging the ends of said grating; substantially as described.

In testimony whereof I affix my signature in presence of two witnesses.

FRANK B. MILLS.

Witnesses:
  ANNA G. CARTWRIGHT,
  H. G. CARTWRIGHT.